Patented Mar. 6, 1951

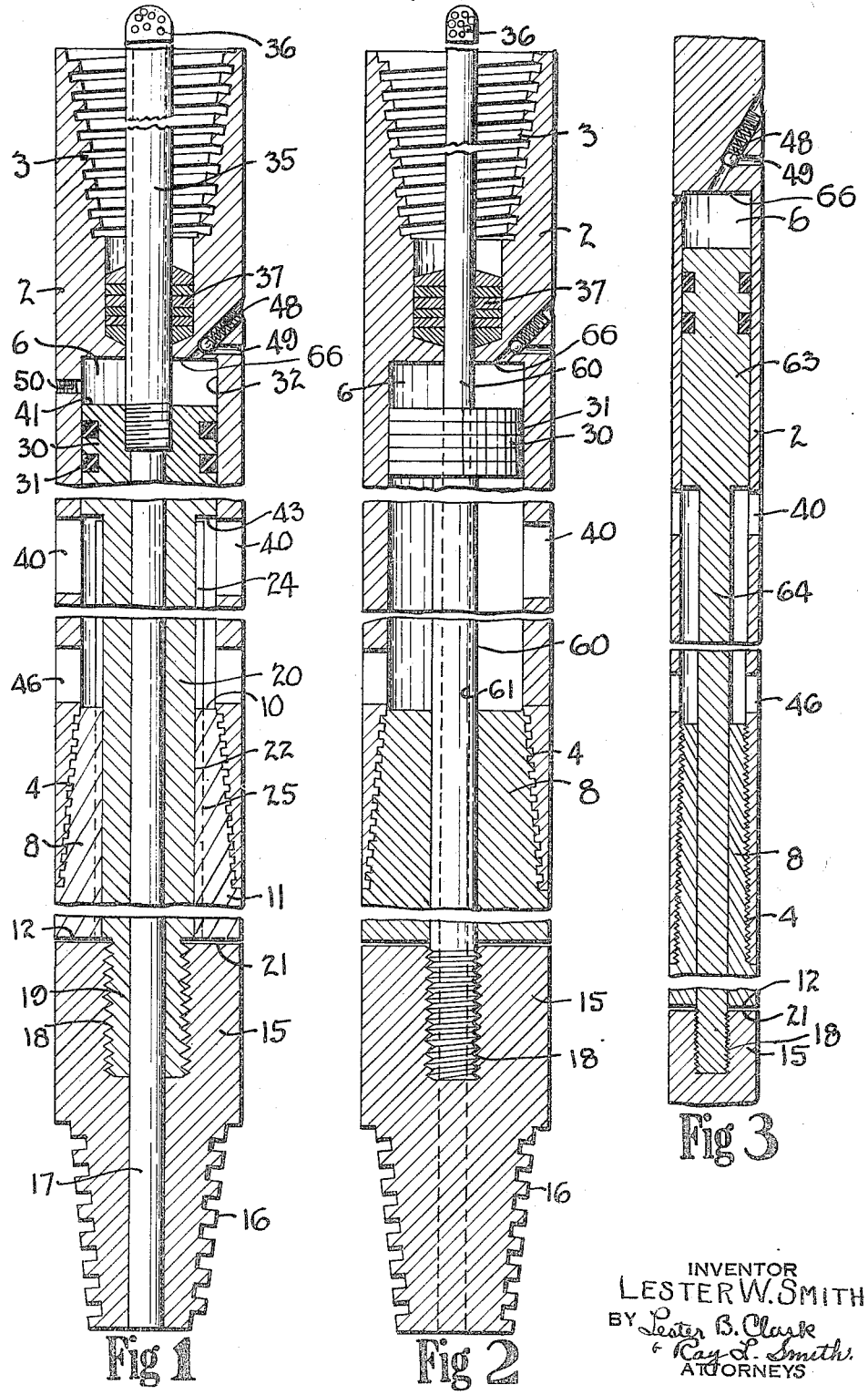

2,544,473

UNITED STATES PATENT OFFICE 2,544,473

HYDROSTATIC ROTARY JAR

Lester W. Smith, Corpus Christi, Tex.

Application May 24, 1946, Serial No. 671,920

2 Claims. (Cl. 255—27)

The invention relates to a hydrostatic jar for use in releasing, or jarring loose, stuck members in a well bore.

In the drilling of wells it is not uncommon for a string of pipe or other tool, to become lodged in the well bore due to caving of the material, twisting off of the pipe, the breaking of a cable or the uncoupling of a joint or connection. A portion of pipe or other equipment may thus become stuck and incapable of being removed by a straight pull thereon, but may be often jarred loose.

The present invention relates to a jar which can be connected to a stuck member in a well and a pull exerted thereon so that after a predetermined pull, to create a vacuum, the jar will release such vacuum to move sharply to jar the member.

Another object is to provide a hydrostatic jar having a cylinder and piston construction so that a pull on one while the other is immovable, will set off a vacuum in the cylinder which will release to cause jarring of the movable portion.

Another object is to provide a hydraulic jar to which the hydrostatic pressure in a well bore will be applied in combination with a mechanical pull to cause a jarring action upon a stuck member.

Still another object is to provide a hydrostatic jar to release and apply a shock to a stuck member in a well.

Other and further objects of the invention will be readily apparent when the following description is considered in connection with the following drawings wherein:

Fig. 1 is a vertical sectional view of the jar ready for connection to the stuck member and the operating pipe;

Fig. 2 is a vertical sectional view of a modified construction;

Fig. 3 is a vertical sectional view of still another modified construction.

In Fig. 1 a hydrostatic jar is shown, including a tubular body 2 having a threaded box 3 at the upper end which is arranged to receive the operating pipe by which the jar is manipulated. Another threaded box 4 is provided at the lower end. This body 2 is hollow to provide a hollow cylinder or cylindrical chamber 6 which extends to an internal shoulder 66 at a point adjacent the upper end of the body.

A plug 8 is threaded into the box 4 and the inner end or shoulder 10 thereof closes the bottom of the cylinder while the lower end 11 of the plug forms a flat surface 12.

A base 15 is also a tubular member and has a threaded pin 16 on the lower end so as to connect the tool to the member which is stuck in the well.

These threads 16 are shown as being of the coarse acme type often found in tool joints or other construction which may be encountered as upstanding on the end of a pipe stuck in a well bore.

The base 15 has a central passage 17 therein and has a threaded socket 18 at its upper end which receives the lower threaded end 19 of a piston rod 20. This piston rod is upstanding above the flat surface 21 on the upper end of the base and extends through a passage 22 in the plug 8 and thence upwardly into the chamber 6 in the body 2. A key or spline 24 is shown on the side of this piston rod and this key is arranged to slide in a slot or groove 25 in the plug so as to prevent relative rotation of the body and the base.

The upper end of the piston rod 20 is enlarged to form the piston 30 carrying the packing rings 31. These rings form a seal with the periphery 32 of the chamber 6.

A tubular stem 35 is threaded into the piston and is of a length to extend upwardly through the box 3 in the upper portion of the body. This stem may be closed at the top but should have a plurality of openings or perforations 36 therein to permit fluid to pass into the stem while preventing particles of material from passing through the tool. This stem is sealed in the body by the packing 37.

It seems obvious from the foregoing description that the body 2 is capable of relative sliding movement with respect to the base 15, piston rod 20, piston 30, and stem 35, while these four members together constitute the tubular element providing a flow passage through the entire tool. Inasmuch as the piston 30 is affixed to the base, any movement of the body will cause the body to slide upon the piston.

With the parts in the position shown in Fig. 1 an upward pull on the body 2 will create a suction or vacuum in the chamber 6 which resists the upward movement of the body so that a substantial pull has to be exerted on the body in order to raise the body any substantial amount relative to the piston. The wall of the body about the chamber 6 is provided with elongated slots or parts 40 best seen in Fig. 1. When the upward pull on the body 2 is sufficient to move these slots 40 to such an elevation that the upper portion of the slots pass the upper end 41 of the piston, then of course any liquid in the well bore will rush into the chamber 6, releasing the suction which has been opposing the movement of the body 2. The release of this suction permits the body 2 to move sharply upwardly due to the pull which is exerted thereon as a result of the contraction of the operating pipe. This movement causes the upper end 10 of the plug 8 to strike sharply against the shoulder 43 which forms the lower end of the piston around the piston rod 20. This shock imparts a jar to the piston, the piston rod 20, the base 15, and any pipe or other member to which the base has been connected.

It seems obvious that the parts can be made of any size and length so as to impart a tremendous shock or jar to the base portion. Additional slots or parts 46 are shown in the wall of the body adjacent the top of the plug 10 so as to allow the ready escape of any liquid from the chamber 6 in the area below the piston. In this manner the liquid does not form a cushion or interfere with the jar which is being obtained.

When the body 2 is again lowered so that the chamber 6 slides down around the piston, any liquid which has moved into the chamber 6 may escape through the check valve 48 and out through the passage 49 in the side of the body.

In some instances, it may be desirable to impart a mechanical jar without utilizing the suction and in this instance the opening 50 may be provided so as to eliminate any suction in the chamber 6. When the suction is to be employed a suitable pin will be used to fill this opening 50.

In Fig. 2 the construction is substantially the same as previously described except the piston rod 20 has been substantially reduced in size and is in the form of a small pipe 60 having the passage 61 therethrough.

Fig. 3 shows a modified form where no circulation is provided and where the piston 63 and the piston rod 64 are of solid construction. The remaining parts are the same as previously described.

Broadly the invention contemplates a hydrostatic rotary jar which can be utilized to impart a sharp shock or jar to a piece of equipment in a well bore.

The invention claimed is:

1. In a hydraulic jar for wells, the combination of, a body having upper and lower transverse closure portions combining with the body wall to enclose a cylindrical chamber terminated by upper and lower internal shoulders, a tubular element extending axially through said body, port means through said body adjacent the lower end of said chamber, the upper end of said body enclosing an open space above said upper closure portion and being adapted for connection to the well operating pipe into which said element extends and the lower end of said element being adapted for connection to an object to be jarred, said element including a piston thereon between said shoulders and operable within said chamber above said port means when proximate the upper end of said chamber, and relief port means connecting said chamber above said piston and the exterior of said body, an upward pull on the pipe creating vacuum in said chamber above said piston until said port means moves upwardly past said piston and is uncovered to break the vacuum, the stretched pipe contracting when the vacuum is broken to jerk said body upwardly to bring said lower shoulder into jarring contact with said piston to jar said object, fluid entering said chamber above said piston after the vacuum is broken being forced out said relief port means when said body is lowered with relation to said piston, said tubular element including a tubular portion extending into said open space and having opening means in the upper end thereof to permit fluid to flow downwardly through said tubular element, there being means within said body above said upper shoulder to seal around said tubular portion to prevent fluid from passing between said open space and said chamber while permitting said tubular portion to slide therethrough.

2. In a hydraulic jar for wells, the combination of, a body having upper and lower transverse closure portions combining with the body wall to enclose a cylindrical chamber terminated by upper and lower internal shoulders, a tubular element extending axially through said body, port means through said body adjacent the lower end of said chamber, the upper end of said body enclosing an open space above said upper closure portion and being adapted for connection to the well operating pipe into which said element extends and the lower end of said element being adapted for connection to the object to be jarred, said element including a piston thereon between said shoulders and operable within said chamber above said port means when proximate the upper end of said chamber, relief port means connecting said chamber above said piston and the exterior of said body, and an opening through said body into said chamber above said piston, an upward pull on the pipe bringing said lower internal shoulder into jarring contact with said piston to jar said object, fluid being drawn through said opening into said chamber to resist the creation of vacuum therein as said body is drawn upwardly, fluid in said chamber above said piston being forced out said opening and out said relief port means when said body is lowered with relation to said piston, said tubular element including a tubular portion extending into said open space and having opening means in the upper end thereof to permit fluid to flow downwardly through said tubular element, there being means within said body above said upper shoulder to seal around said tubular portion to prevent fluid from passing between said open space and said chamber while permitting said tubular portion to slide therethrough.

LESTER W. SMITH.

REFERENCES CITED

The following references are of record in the file of this patent:

UNITED STATES PATENTS

| Number | Name | Date |
| --- | --- | --- |
| 1,637,505 | Wigle | Aug. 2, 1927 |
| 1,804,700 | Maxwell | May 12, 1931 |
| 1,927,836 | Kightlinger | Sept. 26, 1933 |
| 2,180,223 | Collett | Nov. 14, 1939 |
| 2,315,905 | Stafford | Apr. 6, 1943 |